United States Patent
Wolf (10) Patent No.: US 12,444,231 B2
(45) Date of Patent: Oct. 14, 2025

(54) METHOD FOR IDENTIFYING A PERSON BY MEANS OF FACIAL RECOGNITION, IDENTIFICATION APPARATUS AND COMPUTER PROGRAM PRODUCT

(71) Applicant: Bundesdruckerei GMBH, Berlin (DE)

(72) Inventor: Andreas Wolf, Berlin (DE)

(73) Assignee: Bundesdruckerei GmbH, Berlin (DE)

( * ) Notice: Subject to any disclaimer, the term of this patent is extended or adjusted under 35 U.S.C. 154(b) by 429 days.

(21) Appl. No.: 17/635,550

(22) PCT Filed: Aug. 13, 2020

(86) PCT No.: PCT/DE2020/100708
§ 371 (c)(1),
(2) Date: Feb. 15, 2022

(87) PCT Pub. No.: WO2021/032248
PCT Pub. Date: Feb. 25, 2021

(65) Prior Publication Data
US 2022/0300644 A1  Sep. 22, 2022

(30) Foreign Application Priority Data
Aug. 16, 2019 (DE) ...................... 10 2019 122 119.6

(51) Int. Cl.
*G06V 40/16* (2022.01)
*G06F 21/32* (2013.01)
*G06F 21/62* (2013.01)

(52) U.S. Cl.
CPC ............ *G06V 40/171* (2022.01); *G06F 21/32* (2013.01); *G06V 40/165* (2022.01); *G06V 40/172* (2022.01); *G06F 21/6245* (2013.01)

(58) Field of Classification Search
CPC .. G06V 40/171; G06V 40/165; G06V 40/172; G06F 21/32; G06F 21/6245
See application file for complete search history.

(56) References Cited

U.S. PATENT DOCUMENTS

| 2016/0080943 A1* | 3/2016 | Ives-Halperin | ........ G06Q 10/02 713/168 |
| 2020/0097767 A1* | 3/2020 | Perry | ................... G06V 40/165 |

FOREIGN PATENT DOCUMENTS

| DE | 102015108351 A1 | 12/2016 | |
| WO | WO-2016188785 A1 * | 12/2016 | ....... G06Q 20/40145 |

OTHER PUBLICATIONS

P. Korshunov and T. Ebrahimi, "Using face morphing to protect privacy," 2013 10th IEEE International Conference on Advanced Video and Signal Based Surveillance, Krakow, Poland, 2013, pp. 208-213, doi: 10.1109/AVSS.2013.6636641. https://ieeexplore.ieee.org/document/6636641 (Year: 2013).*

(Continued)

*Primary Examiner* — Matthew C Bella
*Assistant Examiner* — Andrew B. Jones (57) ABSTRACT

A method is presented for identifying a person by means of facial recognition. The method includes: providing a depersonalized data set, where the depersonalized data set is calculated from a personalized data set by data transformation according to a transformation instruction; calculating a re-personalized data set from the depersonalized data set, where the re-personalized data set, on the basis of the depersonalized data set, is modified by means of additional data transformation, according to an at least partial reversal of the transformation instruction, in such a way that the person to be identified is identifiable on the basis of the re-personalized data set using the at least one facial recognition algorithm; providing a comparative data set which comprises current facial image data for the person to be identified; and identifying the person using the re-personalized data set, the comparative data set and the at least one facial recognition algorithm.

16 Claims, 2 Drawing Sheets

(56) References Cited

OTHER PUBLICATIONS

Korshunov et al "Using face morphing to protect privacy" 2013 10th IEEE International Conference on Advanced Video and Signal Based Surveillance, IEEE, (Aug. 27, 2013).

Natacha Ruchand "Privacy Protection, Preserving the Utility of Visual Surveillance" Thesis, Feb. 16, 2018 171 pages Retrieved from the Internet: http://www.eurecom.fr/en/publication/5442/download/sec-publi-5442.pdf.

International Search Report and Written Opinion of the International Search Authority, issued in PCT/DE2020/100708, mailed Oct. 19, 2020; ISA/EP.

* cited by examiner

METHOD FOR IDENTIFYING A PERSON BY MEANS OF FACIAL RECOGNITION, IDENTIFICATION APPARATUS AND COMPUTER PROGRAM PRODUCT

CROSS-REFERENCE TO RELATED APPLICATIONS

This application is a 371 U.S. National Phase of International Application No. PCT/DE2020/100708, filed Aug. 13, 2020, which claims priority to German Patent Application No. 102019122119.6, filed Aug. 16, 2019. The entire disclosures of the above applications are incorporated herein by reference.

The invention relates to a method for identifying a person by means of facial recognition, an identification apparatus and a computer program product.

BACKGROUND

Methods for identifying people by means of facial recognition are used in a variety of ways today. In machine facial recognition, facial image data of the person to be identified are processed. One or more facial recognition algorithms are used here in order to evaluate the facial image data for personal identification. Various facial recognition algorithms are known per se. In addition to two-dimensional biometric facial recognition, in which commercially available cameras are used for recording, there are known methods which use three-dimensional (3D) recording of the face, for example by means of structured light projection. The facial recognition algorithms are implemented for machine facial recognition using software applications which can be executed on one or more data processing devices to carry out personal identification by means of facial recognition.

Furthermore, personal identification based on facial recognition can also be carried out without machines or manually. In this case, a comparison facial image can be displayed to a person who is to perform the test, for example security personnel, on a display device, such that the person performing the identification can compare said comparison facial image with a live image, a photo or the face of the person standing in front of them.

Facial recognition is a form of evaluation of biometric properties for personal identification. DE 10 2015 108 351 A1 discloses an identification server for identifying a person to be identified, which comprises the following: a memory for providing a plurality of personal data sets which are assigned to different people, each personal data set having a biometric reference feature of a person that is transformed by means of a personalized transformation rule or instruction, a communication interface for receiving a person recognition via a communication network, the person recognition being assigned to the person to be identified, and a processor which is configured to read out an indication of the personalized transformation rule assigned to the person to be identified from the memory on the basis of the received person recognition, the communication interface being configured to transmit a request for transmitting a biometric feature of the person to be identified that is transformed by means of the personalized transformation rule via the communication network. The request includes the indication of the personalized transformation rule. The communication interface is also configured to receive the transformed biometric feature of the person to be identified via the communication network. The processor is configured to compare the received transformed biometric feature with the transformed biometric reference feature in order to identify the person to be identified.

When using facial recognition for personal identification, the legal regulations with regard to data protection must be observed. These set strict limits on the storage of personal data, for example facial image data, which significantly restricts the applicability of personalized data with facial image data.

SUMMARY

The problem addressed by the invention is that of providing a method for identifying a person by means of facial recognition, an identification apparatus and a computer program product, by means of which the usability of facial recognition is facilitated in various fields of application while complying with data protection regulations.

In order to solve this problem, a method for identifying a person by means of facial recognition, an identification apparatus, an access control system, and a computer program product are provided according to the independent claims. The dependent claims relate to embodiments.

According to one aspect, a method is provided for identifying a person by means of facial recognition, a depersonalized data set being provided in an identification apparatus in the method. The depersonalized data set is calculated from a personalized data set by means of a data transformation according to a transformation rule or instruction. The personalized data set comprises facial image data for a person to be identified, on the basis of which the person to be identified is identifiable using at least one facial recognition algorithm. The depersonalized data set, on the basis of the personalized data set, is modified due to the use of the data transformation according to the transformation rule in such a way that the person to be identified is no longer identifiable on the basis of the depersonalized data set, which comprises facial image data which have been modified in accordance with the transformation rule, using the at least one facial recognition algorithm. The method further comprises the following steps: providing transformation data which indicate the transformation rule in the identification apparatus; calculating a re-personalized data set from the depersonalized data set, the re-personalized data set, on the basis of the depersonalized data set, being modified by means of a further data transformation according to an at least partial reversal of the transformation rule in such a way that the person to be identified is identifiable on the basis of the re-personalized data set using the at least one facial recognition algorithm and/or at least one other facial recognition algorithm which is different from the at least one facial recognition algorithm; providing a comparative data set which comprises current facial image data for the person to be identified; and identifying the person using the re-personalized data set, the comparative data set and the at least one facial recognition algorithm and/or the at least one other facial recognition algorithm.

According to a further aspect, an identification apparatus is provided that has one or more processors which are configured to carry out the following in order to identify a person by means of facial recognition: providing a depersonalized data set, the depersonalized data set being calculated from a personalized data set by means of a data transformation according to a transformation rule, the personalized data set comprising facial image data for a person to be identified, on the basis of which the person to be identified is identifiable using at least one facial recognition algorithm, and the depersonalized data set, on the basis of the personalized data set, being modified due to the use of the data transformation according to the transformation rule in such a way that the person to be identified is no longer identifiable on the basis of the depersonalized data set, which comprises facial image data which have been modified in accordance with the transformation rule, using the at least one facial recognition algorithm. Furthermore, the processor or processors are configured to carry out the following: providing transformation data which indicate the transformation rule; calculating a re-personalized data set from the depersonalized data set, the re-personalized data set, on the basis of the depersonalized data set, being modified by means of a further data transformation according to an at least partial reversal of the transformation rule in such a way that the person to be identified is identifiable on the basis of the re-personalized data set using the at least one facial recognition algorithm and/or at least one other facial recognition algorithm which is different from the at least one facial recognition algorithm; providing a comparative data set which comprises current facial image data for the person to be identified; and identifying the person using the re-personalized data set, the comparative data set and the at least one facial recognition algorithm and/or the at least one other facial recognition algorithm.

A computer program product is also provided.

While the person to be identified is automatically (by means of digital data processing) identifiable on the basis of the at least one facial recognition algorithm using the personalized data set comprising the facial image data, the personalized data set was modified in accordance with the transformation rule when the depersonalized data set was derived or determined therefrom in such a way that such machine facial recognition is no longer possible, at least using the at least one facial recognition algorithm. For example, the point from which the originally personalized data set is depersonalized due to a modification according to the transformation rule, which is optionally carried out in successive modification steps, to the extent that machine facial recognition is no longer possible on the basis of the data set depersonalized in this way can be determined experimentally. A "distance" between the personalized data set and the depersonalized data set, i.e. the difference between the facial image data and the modified facial image data, can in this case depend on the specific facial recognition algorithm. In the case of different facial recognition algorithms, different data transformations can be used for depersonalization in order to determine the depersonalized data set in each case. Facial recognition algorithms are known per se in various embodiments and can be used for the experimental determination of the depersonalized data set.

The transformation rule for depersonalization can be determined once and then used for different uses without the need for a new (experimental) determination. Therefore, it does not have to be determined (again) for each depersonalization whether a current personalized data set is "sufficiently" depersonalized. Rather, a previously determined transformation rule can be used without such a check.

The transformation rule specifies how the data transformation for calculating or determining the depersonalized data set from the personalized data set was carried out as a whole. This can be a log for the data transformation, for example. The transformation rule can be configured such that a complete reversal or inversion of the data transformation is made possible on the basis of the information said rule comprises, such that, on the basis of knowledge of the transformation rule, the depersonalized data set can be converted again or calculated back to obtain the personalized data set which formed the starting point for the data transformation.

By means of the depersonalization of the original personalized data set, a transformed (depersonalized) data set is provided that can be stored in a storage device, for example a local memory and/or a central database, possibly even without the consent of the person who can be identified on the basis of the personalized data set. This is possible because the depersonalized data set, based on the personalized data set, has been "warped" or modified to the extent that it can no longer be assigned to the person, at least using the at least one facial recognition algorithm, such that said person is not machine-identifiable on the basis of the depersonalized data set using the at least one facial recognition algorithm. This facilitates the provision and storage of electronic data for facial recognition applications, for example in connection with access control. If access is required by the person to be identified, the transformation data which indicate the transformation rule or specify information regarding the data transformation that can be evaluated electronically have to additionally be provided. Machine facial recognition using the at least one facial recognition algorithm can only be carried out on the basis of the depersonalized data set if these transformation data are provided. The person to be identified can be given control of the transformation data, such that said data cannot be used without authorization.

In the method, it can be provided that the person to be identified is identifiable on the basis of the personalized data set using at least one additional facial recognition algorithm. The depersonalized data set, on the basis of the personalized data set, is then modified by means of data transformation according to the transformation rule in such a way that the person to be identified is no longer identifiable on the basis of the depersonalized data set and additionally using the at least one additional facial recognition algorithm. During the generation of the depersonalized data set, an experimental check being made in each case as to whether the personalized data set, which is optionally modified piece by piece, can still be machine-evaluated using the at least one facial recognition algorithm and the at least one additional facial recognition algorithm for personal identification. If this is no longer possible in both cases, the original personalized data set is "sufficiently" depersonalized or modified.

The data transformation according to the transformation rule for depersonalization can lead to the depersonalized data set no longer being sufficient (evaluable) for machine facial recognition, not only for the at least one facial recognition algorithm, but also for a plurality of facial recognition algorithms, even if this was optionally experimentally determined specifically for only one or more of the plurality of facial recognition algorithms during the provision of the depersonalized data set. The at least one additional facial recognition algorithm can additionally or alternatively be used when identifying the person after the re-personalized data set has been determined beforehand.

During the calculation of the depersonalized data set, landmarks for the face of the person to be identified can be modified in accordance with the facial image data by means of data transformation of the transformation rule. Landmarks for use in machine facial recognition are known per se in a defined form, such that one or more landmarks can be selected in order to be used in the data transformation to "warp" the face displayed by the facial image data. Landmarks are defined per se in ISO/IEC 14496-2:2004 (*Infor-* mation technology—Coding of audiovisual objects—Part 2: Visual), for example. This is referred to, for example, by ISO/IEC 39794-5:2020 (*Information technology—Extensible biometric data interchange formats—Part 5: Facial image data*). ISO/IEC 19794-5:2011 (*Information technology—Biometrics—Biometric data interchange formats—Part 5: Face image data*) did so previously.

In this case, a modification of one or more landmarks can be carried out in steps, for example, in order to determine when the originally personalized data set is depersonalized in such a way that machine facial recognition using the at least one facial recognition algorithm is no longer possible. One or more modification limits within which the modification takes place during the data transformation to be specified for the one or more landmarks. In this case, the landmark limits can specify minimum modifications and/or permitted maximum modifications.

At least some of the landmarks can be modified in each case by different transformation steps which are determined, for example, randomly, i.e. according to the random principle, for example with regard to direction and distance, by the relevant landmark is shifted. In this case, the modifications to the landmarks can be at least partially different or also independent of one another, i.e., for example, such that the landmarks are not all shifted in the same direction and by the same distance (although the modifications may still be dependent with respect to the error limits). As a result, in particular the arrangement of at least some of the landmarks relative to one another is modified. Since this "shaking" of the image data modifies at least some of the parameters which are essential for machine facial recognition, including those parameters which are naturally unchangeable, e.g. by facial expressions, such as the interpupillary distance or the like, machine facial recognition is made more difficult or even impossible.

For the human eye, however, these modifications (i.e. in particular an independent modification of the landmarks within certain error limits) are usually only perceptible as "distortions" of the face, which, however, does not or hardly affects the recognition of the face for most observers, particularly if the rest of the image is otherwise substantially not modified (in contrast, for example, to a modification of the entire image, e.g. with regard to resolution, sharpness, color and the like, in which the modifications of all parts of the image take place in dependence on one another, which can also impair recognition by a human observer).

During the re-personalization of the depersonalized data set, the landmarks can then be reset to their original values (within permissible error tolerances) in order to determine the re-personalized data set. In this way, the facial image data can be (re-)determined completely or partially from the personalized data set The transformation rule provides information regarding the modifications made to the landmark or landmarks during depersonalized.

The face (to be identified) can be triangulated on the basis of the original landmarks and the new landmarks. The edge lengths can then be compared with one another for all triangles determined in this case. It can be provided that, during depersonalization, each individual edge length does not differ by more than a threshold value, for example. The modified facial image data can be determined in such a way that the sum of all the differences does not differ by more than an additional threshold value which is also to be determined.

The transformation data which indicate the transformation rule can be read in via a communication interface of the identification apparatus. The transformation data can be read in via the communication interface, for example from a mobile or portable data memory, for example a so-called smart card or a personalized token on which the transformation data was previously stored. In this way, the transformation data can be made available to the person to be identified, such that the person to be identified brings the transformation data with them, for example to a facial recognition location, for example an access control, using the identification apparatus. The identification apparatus itself does not have the transformation data before said data are read in or received via the communication interface. Alternatively or in addition, the transformation data can be received from a remote server upon a request from the identification apparatus. An electronic signature can be provided for the transformation data.

The identification apparatus can have an image data capture device for capturing the current facial image data, by means of which device the current facial image data of the person to be identified can be captured during identification, it being possible for the facial image data to contain 2D data, for example as a still or moving image from a camera, and/or 3D data, for example generated using pattern projection onto the face.

In an access control system, the identification apparatus can transmit an access authorization signal to an access control device after successful identification of the person, in order to authorize the person for access, and/or, can transmit a corresponding access refusal denial after unsuccessful identification, in order to deny the person access. "Access" can in this case be understood to mean "physical" access or entry to a room, building, site and the like, which is granted or denied, for example, by corresponding actuation of a door opener or the like, access or entry to an object, e.g. authorization to open for a container, safe, etc., or "virtual" access to a computer system, electronic device and the like, such as logging in, unlocking, etc.

The personalized data set can be iteratively modified during the execution of the data transformation according to the transformation rule, it being checked in each case after the completion of successive iteration steps whether the person to be identified is still identifiable on the basis of the relevant current modified/(partially) depersonalized data set using the at least one facial recognition algorithm. In this case, the personalized data set is modified in steps for depersonalization, i.e. the distance between the personalized data set (facial image data) and the data set modified to form the depersonalized data set (modified facial image data) is increased in steps, which results in a stepwise or piecewise modification of the face of the person to be identified that is represented by the facial image data. The modification (distance increase) is continued if it is determined when checking the current depersonalized data set that the person to be identified is still identifiable using the at least one facial recognition algorithm on the basis of this current data set. Otherwise, the iterative (stepwise) data transformation is terminated. The transformation rule can then display or document the partial data transformations carried out in the individual modification steps and/or (only) the (maximum) modification of the personalized data set.

The depersonalized data set can be configured (by means of the modification made for depersonalization) such that the person to be identified is identifiable with the human eye on the basis of the modified facial image data. In this embodiment, the data transformation (modification) of the personalized data set carried out for depersonalization is limited to the extent that non-machine or manual facial recognition by a person is still possible if the person compares a facial image based on the depersonalized data set (modified facial image data) and a comparison image of the person to be identified. It is known that people or persons are still able to carry out a person identification by means of image comparison when the facial recognition algorithms which are used for machine facial recognition have already failed (for example as explained above with regard to the modifications of the landmarks). This embodiment allows, for example, access control in which the access control personnel is shown the facial image on the basis of the depersonalized data set, such that the access control staff can compare this image or representation of the face with a comparison image of the person to be identified, for example a live image or the person standing at the access control. If machine facial recognition is dispensed with in this case, the transformation data does not need to be provided. The original personalized data set is depersonalized (depersonalized data set), such that the requirements for the electronic storage of this data set are lower than in comparison to the storage of the personalized data set. In addition, manual facial recognition is still possible. The limit at which the depersonalized data set still allows manual facial recognition can be determined experimentally by the modified (for example piece by piece) data set being output via a display device and user input (test personnel) being captured that indicates whether the output facial image, in comparison to a comparison image, can still be assigned to the comparison image by the testing personnel, such that personal identification is possible or not. Alternatively or in addition, for example, modification limits for the landmarks used for facial recognition can be specified in the transformation rule, such that the depersonalization is carried out within limits which lead to a depersonalized data set which still allows manual facial recognition.

The modified facial image data and the current facial image data can be output via an image output device in order to be provided for manual personal identification. The display of the modified facial image data and the current facial image data on the image output device allows a person to compare the faces in order to carry out manual personal identification, for example in the context of access control.

In one embodiment, a method for identifying a person by means of facial recognition is provided, in which method a depersonalized data set is provided in an identification apparatus. The depersonalized data set is calculated from a personalized data set by means of a data transformation according to a transformation rule. The personalized data set comprises facial image data for a person to be identified, on the basis of which the person to be identified is identifiable using at least one facial recognition algorithm. The depersonalized data set, on the basis of the personalized data set, is modified due to the use of the data transformation according to the transformation rule in such a way that the person to be identified is no longer identifiable on the basis of the depersonalized data set, which comprises facial image data which have been modified in accordance with the transformation rule, using the at least one facial recognition algorithm. The method further comprises outputting the depersonalized data set, in particular the modified facial image data, via an output device, in such a way that the modified facial image is displayed, such that it is available for manual facial recognition. The modified facial image data (still) allow manual facial recognition, but not machine facial recognition. A user input which indicates whether the person could be identified or not can be received via an input device of the identification apparatus, for example a keyboard or a touch-sensitive surface. This signal can then be processed further, for example for the automated operation of an access control device.

The embodiments explained above in connection with the method for identifying a person by means of facial recognition can be provided accordingly in connection with the identification apparatus.

DESCRIPTION OF THE EMBODIMENTS

Embodiments are explained in greater detail below with reference to the drawings, in which.

Figure 1:
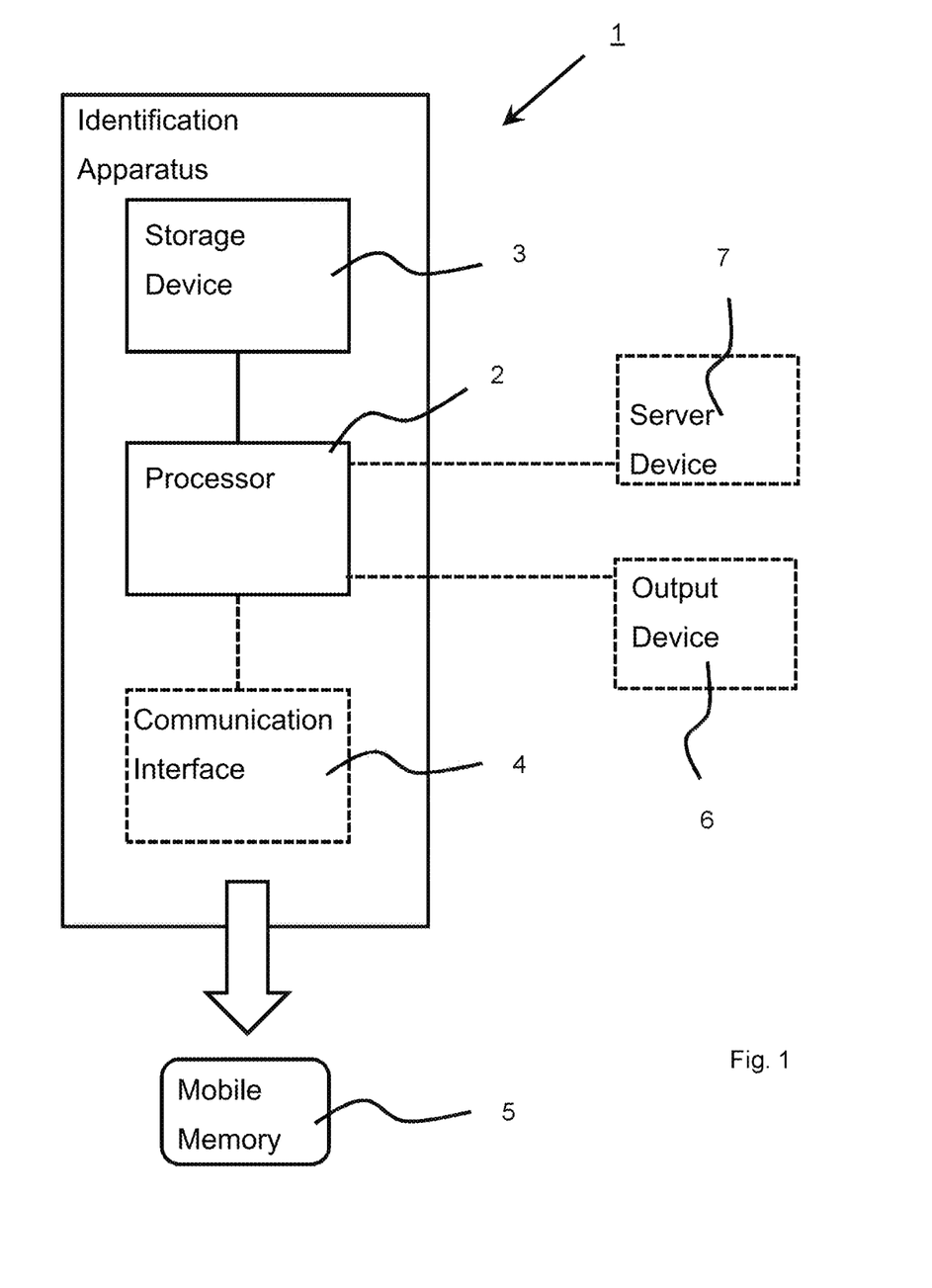
FIG. 1 is a schematic view of an arrangement having an identification apparatus.

FIG. 1 is a schematic view of an arrangement having an identification apparatus 1, by means of which machine personal identification can be carried out. The identification apparatus 1 has a processor 2 which is connected to a storage device 3 and a communication interface 4 in terms of data technology, such that electronic data can be exchanged. A plurality of processors can alternatively be provided. The communication interface 4 can be configured, for example, to read a mobile or portable data memory 5, for example a smart card, in a contactless or contact-based manner.

An output device 6 can be coupled to the identification apparatus 1, for example an image data output device, which is shown in FIG. 1 by means of dashed lines. The output device 6 can be formed identification apparatus 1 or separately therefrom. Part of the for data exchange, the identification apparatus 1 can be temporarily or permanently connected to a server device 7.

In one embodiment, the identification apparatus 1 can be used in conjunction with an access control system (not shown) which is configured for access control using machine and/or manual facial recognition.

Figure 2:
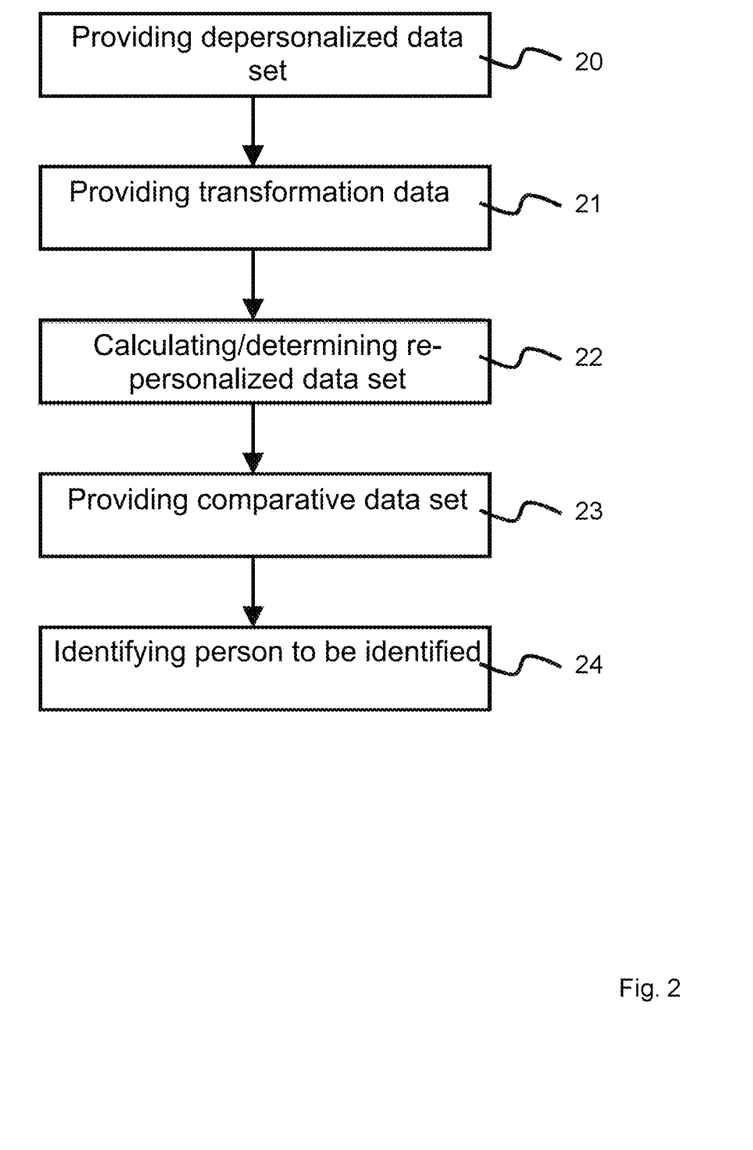
FIG. 2 is a schematic view for explaining a method for identifying a person by means of facial recognition.

FIG. 2 is a schematic view of a flowchart for a method for identifying a person by means of facial recognition using the identification apparatus 1. In one step 20, a depersonalized data set is provided in the identification apparatus 1, for example in such a way that the depersonalized data set is stored in the storage device 2. The depersonalized data set has previously been calculated from a personalized data set by means of a data transformation according to a transformation rule. This can take place in the identification apparatus 1 itself or in another data processing device (not shown). The personalized data set from which the depersonalized data set is derived comprises facial image data for a person to be identified. On the basis of the facial image data, the person to be identified is identifiable using at least one facial recognition algorithm in the context of machine facial recognition. This means that, by means of the at least one facial recognition algorithm, the personalized data set comprising the facial image data can be processed in such a way that personal identification can be carried out from a comparison with a (current) image of the person that is provided for comparison. The at least one facial recognition algorithm is therefore able to process the personalized data set and data relating to the current facial image in order to identify the person. Facial recognition algorithms are known per se in various embodiments.

In order to generate the depersonalized data set on the basis of the personalized data set, a data transformation according to the transformation rule is used for the depersonalized data set, such that the personalized data are modified in such a way that the person to be identified is no longer identifiable on the basis of the depersonalized data set (at least) using the at least one facial recognition algorithm. In this case, the facial image data are in particular modified to give modified facial image data in such a way that the at least one facial recognition algorithm is no longer able to identify the person in the context of machine facial recognition.

In step 21, transformation data which indicate the transformation rule are provided in the identification apparatus 1. This can be, for example, a log relating to the modifications to the data (in particular the facial image data) from the personalized data set during the production of the depersonalized data set. The transformation data can comprise a differential image for the facial image data and the modified facial image data.

The transformation of the depersonalized image into the re-personalized image can be carried out, for example, by completely or partially inverting the processing steps carried out for the modification, step by step. This may take longer, but it has the advantage that the coding of the modification steps (depersonalization) is possible in a very compact manner, since it is not determined what is to be done with each individual pixel. For example, the following may be provided: selecting the landmark 9.3 (this is the tip of the nose); marking a circle having a radius of 30 pixels around this landmark and moving the landmark 9.3 five pixels to the right and adjusting all pixels in the circle proportionally. Such standard operations are offered, for example, by the software application "Gimp" (for example in version 2.10.12, release 2); the encoding thereof would then be the type of operation, the location of the landmark, the circle diameter and the new location of the landmark. GIMP (GNU Image Manipulation Program) is a pixel-based graphics program which includes functions for image processing and for digitally painting raster graphics. The program is free software and can be used free of charge.

If the list of operations carried out for modifications is not inverted, for example if possible data losses from the included partial compressions become too great, a pixel-by-pixel differential image can additionally or alternatively be determined as the transformation rule.

In step 22, a re-personalized data set is calculated or determined from the depersonalized data set in the identification apparatus 1, the re-personalized data set, on the basis of the depersonalized data set, being modified by means of a further data transformation according to an at least partial reversal or inversion of the transformation rule in such a way that the person to be identified is (again) machine-identifiable on the basis of the re-personalized data set using the at least one facial recognition algorithm and/or at least one other or additional facial recognition algorithm which is different from the at least one facial recognition algorithm. By means of the further data transformation, the depersonalized data set can be partially or completely converted back into the personalized data set. By means of the further data transformation, it is achieved that machine facial recognition is possible again.

After a comparative data set is provided in step 23 that comprises current facial image data for the person to be identified, the person to be identified is identified (by machine) in step 24 using the re-personalized data set, the comparative data set and the at least one facial recognition algorithm and/or the at least one other facial recognition algorithm. The facial recognition algorithm processes data from the re-personalized data set and the comparative data set in order to identify the person.

The transformation data can be provided (step 21) in the identification apparatus 1 in that the transformation data are read in from the mobile data carrier 5 via the communication interface 4, for example from a so-called smart card 5 or another data token.

During the depersonalization of the personalized data set (before the depersonalized data set is provided in the identification apparatus 1), the depersonalization can be limited in such a way that the modified facial image data of the depersonalized data set that are generated during the data transformation still allow non-machine or manual facial recognition by a person if the person compares the modified facial image data with a comparison image of the person to be identified.

The procedure for depersonalizing the originally personalized data set is explained in more detail below.

It is known that automated or machine facial recognition methods usually use the geometry of the face, i.e. the position of certain prominent points on the face, to determine similarities between faces. These points are also known as landmarks; for many applications, facial landmarks are standardized in ISO/IEC 14496-2:2004, for example. The biometric face data format ISO/IEC 19794-5 or ISO/IEC 39794-5 also refers to ISO/IEC 14496-2.

Manual (non-machine) facial recognition is known from everyday life to be more robust in comparison with automated methods. People are known to be better at handling deviating poses or sub-optimal light than machine methods. The aim of depersonalization is to modify a facial image of a person in such a way that it can no longer be assigned to a comparison photo by (selected) machine methods, but can be assigned to a comparison photo by people with average recognition skills, in order to still allow manual facial recognition.

In this case, the following can be provided in an embodiment for depersonalizing facial image data:

1. Landmarks are determined in the facial image. Depending on the embodiment, this can be some or all landmarks according to ISO/IEC 14496-2 and/or additional landmarks, such as the centers of the eyes according to ISO/IEC 39794-5 or similar features.
2. The determined landmarks are shifted/modified by a random distance in a random direction with respect to the original position thereof ("shaken" into a new position).
3. The distance from the landmark to the starting point thereof is determined for the modified landmarks. For example, each individual distance should be no greater than a certain threshold value (maximum modification limit) to be determined. Larger location modifications are rejected as being too dissimilar. It can also be provided that the sum of all the distances is no greater than a second threshold value to be determined. Greater total location modifications are also rejected as being too dissimilar. It can also be provided that the sum of all of the distances is at least as great as a third threshold value to be determined, below which the similarity is assumed to be sufficient for machine systems.
4. If the new landmark configuration is discarded, a new determination takes place after step 2.
5. The face is then triangulated on the basis of the original landmarks and the new landmarks. The edge lengths are compared with one another for all of these triangles. For example, each individual edge length should not differ by more than a further threshold value. It can be provided that the sum of all differences does not differ by more than an additional threshold value which is also to be determined.
6. If the new landmark configuration is discarded, a new determination again takes place after step 2.
7. The texture of the original facial image is then transferred to the new landmark grid using triangulation. Methods known per se from 3D facial recognition can be used for this purpose. The triangles can be stretched/compressed linearly, for example, but the distortion can also take place in such a way that the edges of the triangles merge smoothly into those of the neighboring triangles, and neighboring pixels do not produce any sharp transitions in the optical flow. Further projections of the original grid onto the new grid are possible.
8. For the new facial image, it is optionally checked whether said image can be reliably assigned to the person in question by an automated method, but the original image used for the depersonalization must not be used for this purpose.

The threshold values can be determined on the basis of empirical values or experimentally. In particular in order to determine the threshold value from which it is assumed that machine comparison methods can no longer reliably assign the modified image to the person in question, experimental data are used on a representative set of facial images, such as passport photos, and a number of state-of-the-art facial recognition methods are used. In one variant, the new image can always be tested using an automated method or a selection of automated methods (facial recognition algorithms), and the lower threshold value can be omitted.

In another example, the modified facial image cannot be generated by random positions of the landmarks, but rather using the similarity values generated by the machine comparison method, wherein, from a certain number of possible (small and random) changes in position, the position change having the greatest decrease in similarity value is always used for the next step in an iterative process in a type of gradient approach.

In each case it is logged how the depersonalized image was generated from the original image (transformation data). If machine facial recognition is desired, the (personalized) original can be generated from the modified image by means of inverse processing.

The features disclosed in the above description, the claims, and the drawings may be of relevance, both individually and also in any combination, for implementing the various embodiments.

The invention claimed is:

1. Method for identifying a person by means of facial recognition using an identification apparatus, comprising:
providing a depersonalized data set, wherein
the depersonalized data set is calculated from a personalized data set by means of a data transformation according to a transformation rule,
the personalized data set comprises facial image data for a person to be identified, on the basis of which the person to be identified is identifiable using at least one facial recognition algorithm, and
the depersonalized data set, on the basis of the personalized data set, is modified due to the use of the data transformation according to the transformation rule in such a way that the person to be identified is no longer identifiable on the basis of the depersonalized data set, which comprises facial image data which have been modified in accordance with the transformation rule, using the at least one facial recognition algorithm;
providing transformation data which indicate the transformation rule, wherein the transformation data which indicate the transformation rule are read in to the identification apparatus via a communication interface of the identification apparatus;
calculating a re-personalized data set from the depersonalized data set, wherein the re-personalized data set, on the basis of the depersonalized data set, is modified by means of a further data transformation according to an at least partial reversal of the transformation rule in such a way that the person to be identified is identifiable on the basis of the re-personalized data set using the at least one facial recognition algorithm or at least one other facial recognition algorithm which is different from the at least one facial recognition algorithm;
receiving current facial image data for the person to be identified, where the current facial image data is acquired on site from the person to be identified; and
processing the re-personalized data set and the current facial image data using the at least one facial recognition algorithm or the at least one other facial recognition algorithm, thereby identifying the person.

2. Method according to claim 1, wherein
the person to be identified is identifiable on the basis of the personalized data set using at least one additional facial recognition algorithm, and
the depersonalized data set, on the basis of the personalized data set, is modified by means of data transformation according to the transformation rule in such a way that the person to be identified is no longer identifiable on the basis of the depersonalized data set, even using the at least one additional facial recognition algorithm.

3. Method according to claim 1, wherein, during the calculation of the depersonalized data set by means of data transformation according to the transformation rule, landmarks for the face of the person to be identified are modified in accordance with the facial image data.

4. Method according to claim 3, wherein a modification of one or more landmarks is carried out in steps in order to determine when the personalized data set is depersonalized in such a way that machine facial recognition using the at least one facial recognition algorithm is no longer possible.

5. Method according to claim 4, wherein one or more modification limits are specified for the one landmark or the plurality of landmarks, within which the modification takes place during the data transformation, the modification limits specifying minimum modifications and/or maximum modifications.

6. Method according to claim 3, wherein at least some of the landmarks are each modified in accordance with different transformation steps.

7. Method according to claim 3, wherein at least some of the landmarks are each modified in accordance with randomly determined transformation steps.

8. Method according to claim 1, wherein the personalized data set is iteratively modified during the execution of the data transformation according to the transformation rule, it being checked in each case after successive iteration steps whether the person to be identified is still identifiable on the basis of a respective current depersonalized data set using the at least one facial recognition algorithm.

9. Method according to claim 1, wherein the depersonalized data set is configured in such a way that the person to be identified is identifiable with a human eye on the basis of the modified facial image data.

10. Method according to claim 9, wherein the modified facial image data and the current facial image data are output via an image output device in order to thus be provided for manual person identification.

11. Method according to claim 1, wherein the current facial image data for the person to be identified are captured by means of an image data capture device during the identification of the person.

12. Identification apparatus comprising one or more processors which are configured to carry out the following in order to identify a person by means of facial recognition:
provi­ding a depersonalized data set, wherein
the depersonalized data set is calculated from a personalized data set by means of a data transformation according to a transformation rule,
the personalized data set comprises facial image data for a person to be identified, on the basis of which the person to be identified is identifiable using at least one facial recognition algorithm, and
the depersonalized data set, on the basis of the personalized data set, is modified due to the use of the data transformation according to the transformation rule in such a way that the person to be identified is no longer identifiable on the basis of the depersonalized data set, which comprises facial image data which have been modified in accordance with the transformation rule, using the at least one facial recognition algorithm;
providing transformation data which indicate the transformation rule, wherein the transformation data which indicate the transformation rule are read in to the identification apparatus via a communication interface of the identification apparatus;
calculating a re-personalized data set from the depersonalized data set, wherein the re-personalized data set, on the basis of the depersonalized data set, is modified by means of a further data transformation according to an at least partial reversal of the transformation rule in such a way that the person to be identified is identifiable on the basis of the re-personalized data set using the at least one facial recognition algorithm and/or at least one other facial recognition algorithm which is different from the at least one facial recognition algorithm;
receiving current facial image data for the person to be identified, where the current facial image data is acquired on site from the person to be identified; and
processing the re-personalized data set and the current facial image data using the at least one facial recognition algorithm or the at least one other facial recognition algorithm, thereby identifying the person.

13. Identification apparatus according to claim 12, wherein the identification apparatus further comprises a communication interface circuit which is configured to read in the transformation data from a portable data carrier in order to provide the transformation data.

14. Identification apparatus according to claim 12, wherein the identification apparatus further comprises an image data capture device which is configured to capture the current facial image data for the person to be identified during the identification of the person in order to provide the comparative data set.

15. Access control system, comprising an identification apparatus according to claim 12, and an access-control control device, the identification apparatus being configured to transmit an access authorization signal to the access-control control device after successful identification of the person, which causes the access-control control device to authorize the person for access, and/or to transmit an access denial signal to the access-control control device after unsuccessful identification, which causes the access-control control device to deny the person access.

16. A non-transitory computer-readable medium having computer-executable instructions that, upon execution of the instructions by a processor of a computer, cause the computer to carry out the method according to claim 1.

\* \* \* \* \*